United States Patent
Evankow, Jr.

(10) Patent No.: US 6,618,513 B2
(45) Date of Patent: Sep. 9, 2003

(54) APPARATUS FOR POLARIZATION-INDEPENDENT OPTICAL POLARIZATION SCRAMBLER AND A METHOD FOR USE THEREIN

(75) Inventor: Joseph David Evankow, Jr., Colts Neck, NJ (US)

(73) Assignee: Fibercontrol, Holmdel, NJ (US)

( * ) Notice: Subject to any disclaimer, the term of this patent is extended or adjusted under 35 U.S.C. 154(b) by 0 days.

(21) Appl. No.: 09/922,015

(22) Filed: Aug. 3, 2001

(65) Prior Publication Data
US 2002/0037127 A1 Mar. 28, 2002

Related U.S. Application Data
(60) Provisional application No. 60/223,045, filed on Aug. 4, 2000.

(51) Int. Cl.[7] .................................. G02B 5/30
(52) U.S. Cl. ........................ 385/11; 385/1; 359/483
(58) Field of Search ................... 385/1, 2, 11; 359/483, 359/484, 485, 246, 249

(56) References Cited
U.S. PATENT DOCUMENTS
4,923,290 A * 5/1990 Brinkmeyer et al. ........ 359/245

* cited by examiner

Primary Examiner—Robert H. Kim
Assistant Examiner—Michael H. Caley
(74) Attorney, Agent, or Firm—Michaelson & Wallace; Peter L. Michaelson (57) ABSTRACT

Apparatus and an accompanying method for an optical scrambler and particularly one that provides randomly scrambled states of polarization (SOPs) in an optical fiber. Specifically, polarization independence is achieved by wrapping a single optical fiber around each tube in a cascade of separate piezoelectric tubes, with random amounts of fixed birefringence separating each tube, where each tube is then separately excited on a time-varying basis. The tubes are arranged in two groups. Each tube in the first group is separately excited by combined frequency/amplitude modulation with illustratively different modulating frequencies and amplitudes, and in the second group is excited at illustratively a constant frequency and voltage. Time-varying birefringence produced by each tube perturbs an initial SOP of the light provided by that tube from its original pseudo-stationary position as depicted on a poincaré sphere.

32 Claims, 3 Drawing Sheets

APPARATUS FOR POLARIZATION-INDEPENDENT OPTICAL POLARIZATION SCRAMBLER AND A METHOD FOR USE THEREIN

CLAIM TO PRIORITY

This application claims priority of my U.S. provisional patent application entitled "POLARIZATION-INDEPENDENT OPTICAL POLARIZATION SCRAMBLER" assigned Serial No. 60/223,045, filed Aug. 4, 2000, and which is incorporated by reference herein.

BACKGROUND OF THE DISCLOSURE

1. Field of the Invention

The invention relates to a technique, specifically apparatus and an accompanying method, for an optical scrambler and particularly one that provides scrambled states of polarization in an optical fiber.

2. Description of the Prior Art

Light emanating from many types of lasers is highly polarized and has a relatively constant state of polarization (SOP). The term SOP is a well-known defining metric which describes a relative position of electric fields that make up light and which remains unaltered unless encountering birefringence. Since there are many situations/applications where highly polarized light with a constant SOP is undesirable, optical scrambling was developed. Optical polarization scrambling effectively changes the SOP of light over time.

A technique has been developed in the art that ostensibly produces polarization-independent optical polarization scrambling. This technique utilizes a single-mode optical fiber that has been wrapped around a single cylindrical piezoelectric tube (PZT) where the tube is then activated with an electrical signal having a fixed frequency and a fixed amplitude. In practice, effective optical scrambling could only be achieved if the drive frequency and drive voltage supplied to the PZT were precisely adjusted and controlled. A major drawback of this conventional technique is that an input SOP had to be maintained at a particular SOP in order to achieve effective scrambling; therefore, this technique was actually polarization dependent. Adjusting the electrical drive voltage and frequency was problematic but having to control and maintain the input SOP was even more so and thus highly undesirable. Hence, this technique proved unworkable in practice.

Consequently, a goal still exists in the art to provide an optical scrambling technique which does not require that an input SOP be at any particular value and hence, by exhibiting substantial, if not complete, polarization-independence, obviating any need to control the input SOP.

SUMMARY OF THE INVENTION

Advantageously, the present invention overcomes the deficiencies associated with the conventional technique of providing optical polarization scrambling.

In accordance with my inventive teachings, polarization independence is achieved by wrapping a single optical fiber around each tube in a cascade of separate piezoelectric tubes(PZTs), with random amounts of fixed birefringence separating each tube, where each tube is then separately excited on a time-varying basis. Generally, a time-varying drive signal used to excite any one PZT is independent of that used to excite another such tube. Geometrical, physical displacement of each tube, resulting from its excitation, imparts a time-varying birefringence to that portion of the fiber wound around that particular tube. This time-varying birefringence perturbs an initial SOP of the light from its original pseudo-stationary position on a Poincaré sphere.

Specifically, in a preferred embodiment of the present invention, an optical signal, upon entering the scrambler, passes through a fiber that is tightly wrapped around each successive one of illustratively a first group of three PZTs. Each of these tubes is operated in a similar fashion and is illustratively excited by a modulated radio-frequency (RF) electrical drive signal. This signal, when applied to a PZT, causes that tube to exhibit geometric physical displacement, i.e., the tube slightly expands and contracts physically, in response to the signal. This time-varying displacement, which effectively stresses the fiber wound around that tube, induces time-varying birefringence in the fiber. This time-varying birefringence produced by each tube perturbs the initial SOP provided by that tube from its original pseudo-stationary position on the Poincaré sphere.

A preferred, though illustrative, modulation form of the RF drive signal uses combined frequency and amplitude modulation (FM/AM). Altering the number of independent signal sources by combining them may also be done but will result in slightly different optical performance benchmarks. Specifically, since each RF frequency delivered to a PZT, during FM modulation, requires a unique drive voltage for optimum scrambling, the amplitude of that signal is also varied, hence additionally imparting an amplitude modulation (AM) component to the FM drive signal. For any single FM/AM driven PZT, virtually all input SOPs experience reciprocating deflections from their initial state—from small 10° arcs, to full rotations around the Poincaré sphere. Resulting direction and magnitude of the displacement around the Poincaré sphere depends on the input SOP, the drive voltage, and the RF frequency. For any one FM/AM driven PZT, only a few input SOPs are unaffected by that stage. For these few SOPs unaffected by the first stage, the light passes on through a fixed birefringence and then on to the next stage of the cascaded PZTs. The fixed inter-stage birefringence rotates the input SOP to a new and different SOP before entering the second FM/AM stage where the above process continues. Consequently, given these subsequent modulated stages, the probability of having a fixed non-deflecting SOP is greatly diminished. Empirical experience has shown that three such modulated stages, with their corresponding inter-stage fixed birefringences, provide an adequate level of scrambling for many applications but additional numbers of modulated stages (above three) provide even more random SOP movement. Since the drive frequency applied to each PZT, as a result of the frequency modulation, is such that the tube is driven at several of its resonant frequencies (at which power consumption peaks) for only a very short time, including those frequencies above and below these resonances, a benefit of this FM/AM technique is that advantageously a relatively low overall power is required to drive that tube than would otherwise occur had that tube be driven just at any of its resonant frequencies.

Once the optical signal passes through a final fixed birefringence, after passing through the last of the modulated stages, the SOP of that signal is now moving in a pseudo-random manner. At this point, the optical signal now moves on through the same fiber but which has been wrapped around group of illustratively three cascaded PZTs, with another corresponding set of inter-stage fixed birefringences. Each PZT in this latter cascaded group of tubes is illustratively shown as independently driven at a fixed frequency and a fixed amplitude. The frequency and amplitude of each of the electrical drive signals applied to the PZTs in this latter group can be different from each other. Similarly, altering the number of independent signal sources here by combining them may also be done but will result in slightly different optical performance benchmarks. Similarly to what occurs through the first cascaded group of PZTs, while exciting the second group of tubes with electrical signals of fixed frequency and amplitude, the electrical excitation causes a physical displacement of each of the PZT tubes in this second group, which, in turn, thereby imparts a further time-varying birefringence into the fiber and causes an additional change in the SOP.

I have found that a sufficient degree of polarization-independent scrambling can result from, as described, using six separate PZTs, with three cascaded PZTs located in each of two groups. Some level, though less, of polarization-independence will result from using fewer PZTs, while an enhanced level will result from using more PZTs. However, any marginal improvement in the polarization-independence that results from using each additional PZT over six is likely to diminish.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to multiple figures.

DETAILED DESCRIPTION OF THE INVENTION

Figure 1:
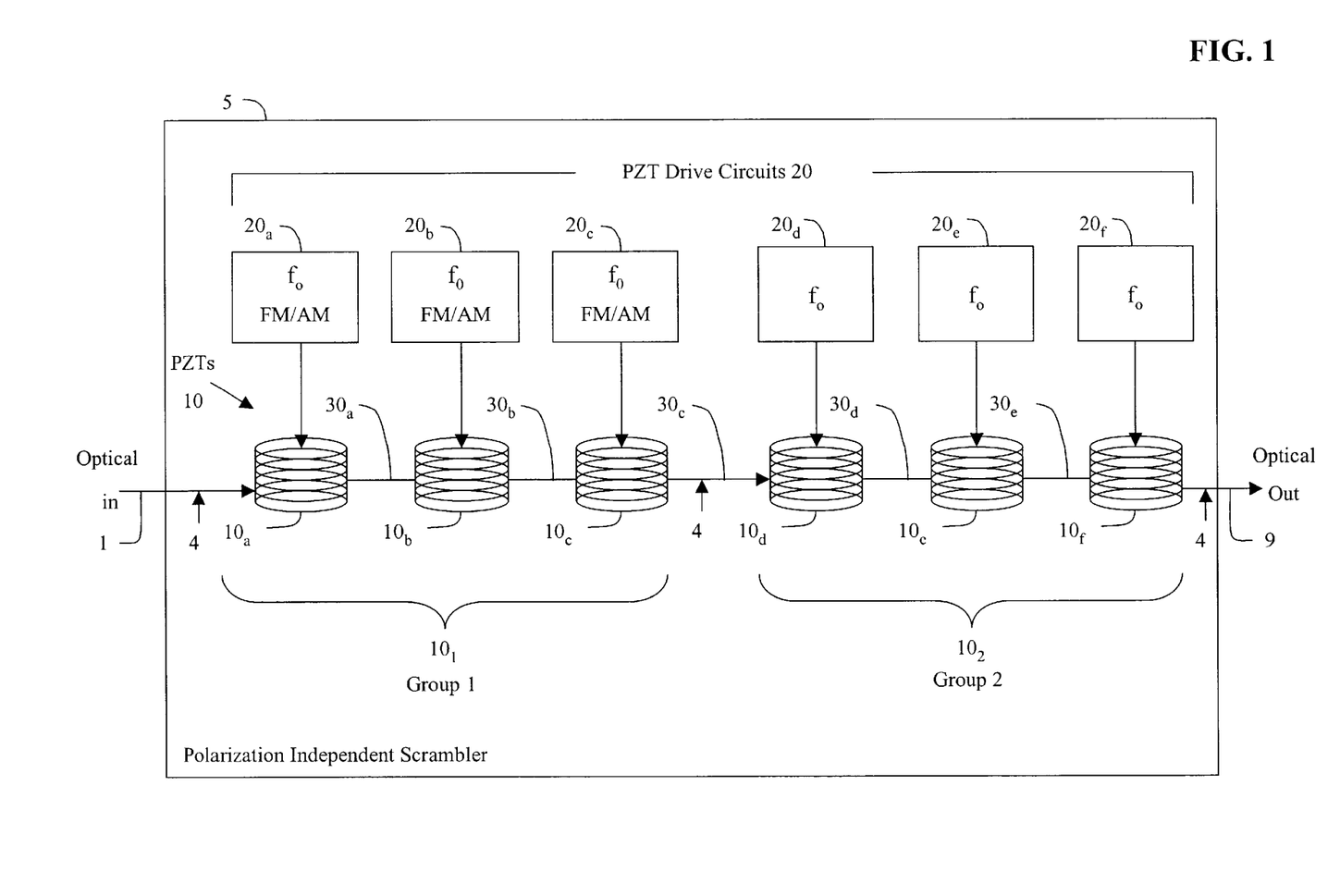
FIG. 1 depicts a high level block diagram of a preferred embodiment of my inventive polarization independent optical scrambler 5.

FIG. 1 shows a high-level block diagram of a preferred embodiment of my inventive polarization independent optical scrambler 5.

As depicted, scrambler 5 utilizes, at its core, two distinct groups $10_1$ and $10_2$ (also referred to as group 1 and group 2, respectively) of piezoelectric tubes (PZTs) 10. Single optical fiber 4 is threaded through the entire scrambler and is wound around each of the tubes in both groups in succession, hence forming the two groups of optically cascaded tubes. The specific manner through which the fiber can be wound around the tubes will be discussed below. Each group of tubes preferably contains three separate tubes: tubes $10_a$, $10_b$ and $10_c$ for group 1; and tubes $10_d$, $10_e$ and $10_f$ for group 2. While embodiment 5 provides excellent polarization-independent scrambling from six such tubes arranged in two groups of three, some level, though less, of polarization scrambling can be achieved through use of fewer tubes; while enhanced scrambling can be achieved using more tubes. However, a marginal improvement in polarization-independence will likely rapidly diminish as additional tubes are utilized though clearly at a price of increased cost and circuit complexity. For all intents and purposes, six tubes, as depicted, will usually suffice in practice.

A random fixed amount of birefringence is inserted in the optical path between each pair of tubes 10. Specifically, as shown, birefringence $30_a$, $30_b$, $30_c$, $30_d$ and $30_e$ is inserted between tubes $10_a$ and $10_b$, $10_b$ and $10_c$, $10_c$ and $10_d$, $10_d$ and $10_e$, and $10_e$ and $10_f$, respectively. In each instance, the specific amount of the added birefringence is not critical and can simply be provided through a segment of fiber 4, of varying length, extended between the tubes with an arbitrarily small number of twists in a given direction. Optical energy enters through input 1 and is channeled into single optical fiber 4 that is wound around each of the PZTs in succession across both groups. After leaving the last tube, fiber 4 is connected to output 9 from which the resulting light is channeled out of the scrambler.

Each of the PZTs is separately excited by a time-varying drive signal to resonate (though not just at each of its natural resonant frequencies) by an electrical drive signal. The drive signal used to excite one PZT is independent of that used to excite another such PZT. This resonating action causes each PZT to geometrically and physically displace (radially expand and contract) with its drive signal. This displacement, in turn, induces, by alternately stressing and relaxing the fiber wrapped around that tube, time-varying birefringence into fiber 4 which perturbs an initial state of polarization (SOP) provided by that tube from its original pseudo-stationary position on a well-known Poincaré sphere (this sphere providing a conventional spherical geometric representation, on its surface, of the states of optical polarization)

Figure 2:
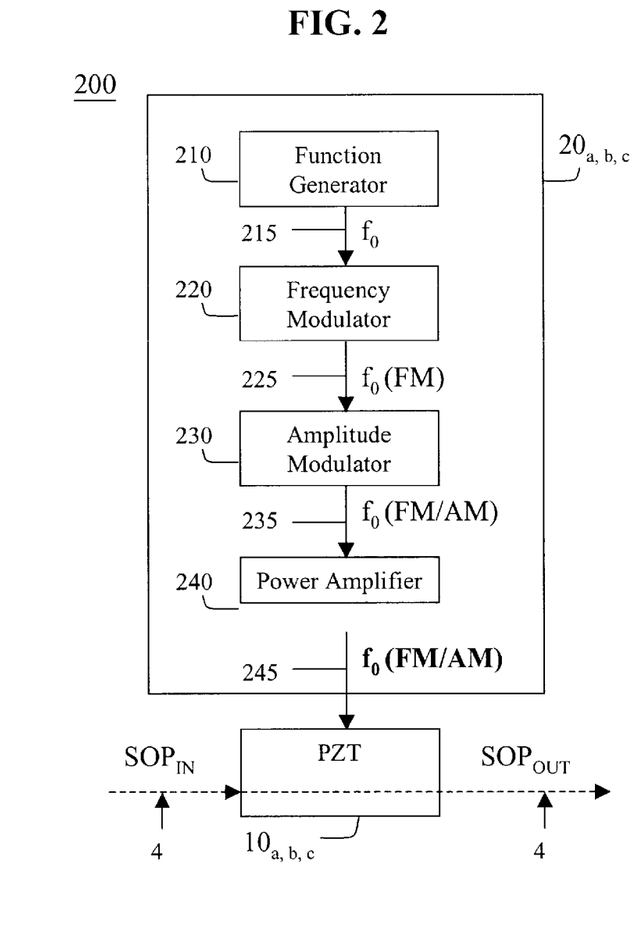
FIG. 2 depicts a block diagram of FM/AM drive circuit 200 and its associated PZTs $10_a$, $10_b$ and $10_c$, with this drive circuit forming each of FM/AM PZT drive circuits $20_a$, $20_b$ and $20_c$ shown in FIG. 1.

Within each group, the constituent PZTs are operated in a similar fashion. For group 1, PZTs $10_a$, $10_b$ and $10_c$ are each excited through corresponding circuits 20, here having individual drive circuits $20_a$, $20_b$ or $20_c$. Each of these circuits, which is shown in FIG. 2 and described in greater detail in the accompany discussion below, produces a frequency modulated drive signal where the carrier at each frequency is also amplitude modulated (FM/AM). In that regard, to produce optimum scrambling, each different RF frequency delivered to a PZT, during frequency modulation, should have a unique corresponding drive voltage. To provide this, once a frequency modulated signal (at fundamental frequency $f_0$) is produced, the amplitude at that frequency then varied; hence amplitude modulating the FM signal. As the signal of the FM signal varies, so does the signal amplitude as well.

For any single FM/AM driven PZT, virtually all input SOPs experience reciprocating deflections from their initial state—from small 10° arcs, to full rotations around the Poincaré sphere. The direction and magnitude of the displacement around the Poincaré sphere depends on the input SOP, the drive voltage, and the RF frequency. For any one of the FM/AM driven PZTs (tubes $10_a$, $10_b$ or $10_c$ in group 1), only a few input SOPs are unaffected by that particular stage. For these few SOPs unaffected by, e.g., first tube $10_a$, light passes on from that tube through fixed birefringence $30a$ and then on to next stage, i.e., PZT $10_b$. Fixed inter-stage birefringence $30_a$ rotates the SOP of the light entering that latter tube to a new and different SOP before that light enters the second FM/AM stage, i.e., tube $10_b$, and so forth. Hence, for these subsequent FM/AM stages (i.e., PZTs $10_b$ and $10_c$), the probability of having a fixed non-deflecting SOP is greatly diminished. Empirical experience has shown that three FM/AM stages, each with its corresponding inter-stage fixed birefringence ($30_a$, $30_b$ and $30_c$), provides an adequate level of pre-scrambling for many applications. Nevertheless, additional numbers of FM/AM stages (above the three shown in group 1) provide even more random movement of the SOP; though, the marginal improvement is likely to rapidly diminish as the number of additional stages added to group 1 increases.

Furthermore, the power consumed by each PZT is determined by its impedance. As expected, impedance of each PZT reaches a minimum (i.e., purely resistive) at each of its resonant frequencies. Since my inventive FM/AM drive technique sweeps through the resonant frequencies of each tube, with very little time spent at any one such resonant frequency, then, that tube, over the vast majority of its driven frequencies, is operated at higher impedances which, in turn, advantageously reduces its overall power consumption. Therefore, through my technique, a relatively low amount of power is required to drive each tube compared to operating at any single resonance.

Table 1 below provides exemplary values, for the FM/AM modulation format, as produced by each of drive circuits $20_a$, $20_b$ and $20_c$:

TABLE 1

EXEMPLARY MODULATION PARAMETERS

| $f_0$ | 550 kHz | ±15 kHz | fundamental RF frequency ramped linearly, sinusoidally, etc. |
|---|---|---|---|
| AM | 100 kHz | 0 ≦ V ≦ 20 | ramped linearly, sinusoidally, etc. |
| FM | 50 kHz | ±25 kHz | ramped linearly, sinusoidally, etc. |

The fundamental frequency, $f_o$, and the FM range (maximum frequency deviation, here illustratively being ±25 kHz) for each PZT in group 1 are determined by material composition, physical dimensions of the PZT tube, and capabilities of the drive voltage from a power amplifier applied to that PZT. Generally speaking, the fundamental frequency can range from below 100 kHz to above 1 MHz, with the exact frequency not being critical, and is flexible enough to match to a wide range of scrambling requirements.

Moreover, the number of resonant frequencies over which the fundamental frequency traverses in the frequency domain for each PZT determines an extent and effectiveness of the FM range (frequency deviation about the fundamental, which can vary from, e.g., less than 1 kHz to more than 1 MHz) for that PZT. The rate of change in frequency, within a given deviation, can be set between illustratively below 1 Hz/second to above 1 MHz/second and can be done in any fashion (e.g., linear, sinusoidal or otherwise), with the value of these parameters being tailored to the end users needs. Though I have described the modulation sequence as first proceeding with frequency modulation then amplitude modulation, this order can clearly by reversed.

The AM modulation can be provided with a modulation-depth (amplitude variation) ranging from less than 1% to more than 90% and which varies between specified limits, within this range, at a sinusoidal rate of between less than 1 Hz to greater than 1 MHz. Here too, these values can be tailored to the needs of an end user.

After the optical signal passes through the last of the FM/AM modulated stages $20c$ and the final fixed birefringence in group 1, i.e., birefringence $30_c$, the SOP of the optical signal is now moving in a pseudo-random manner. At this point, the optical signal now moves on through fiber 4 that has been wrapped around another series of PZTs $10d$, $10e$ and $10f$, with another corresponding set of inter-stage fixed birefringences $30d$ and $30e$ that collectively form group 2.

Figure 3:
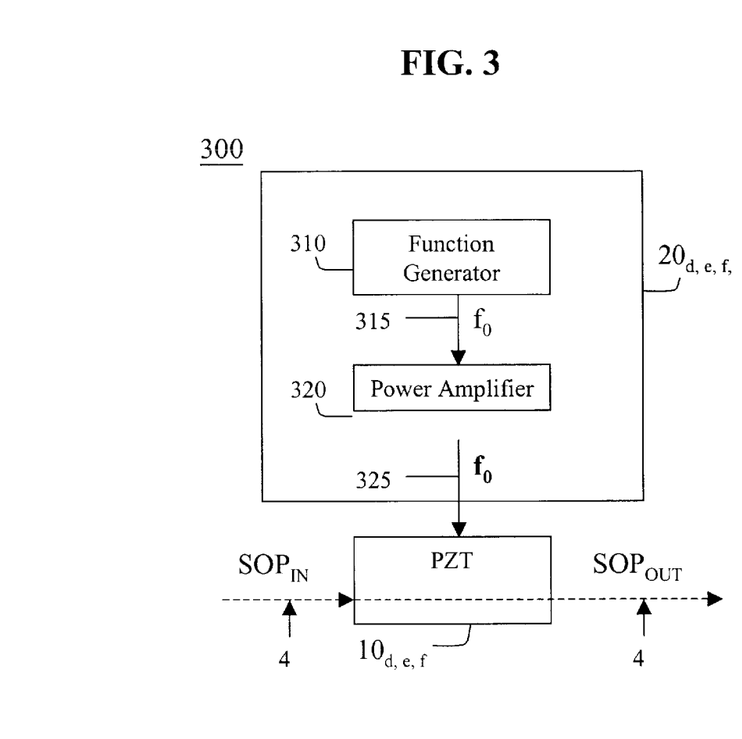
FIG. 3 depicts a block diagram of drive circuit 300 and its associated PZTs $10_d$, $10_e$ and $10_f$, with this drive circuit forming each of PZT drive circuits $20_d$, $20_e$ and $20_f$ shown in FIG. 1.

Each of these particular PZTs independently resonates at a fixed frequency ($f_0$) and fixed amplitude, as excited by drive signals produced, within drive circuits 20, by corresponding drive circuits $20_d$, $20_e$ and $20_f$ (each of these circuits is shown in FIG. 3 and described in detail in the accompanying discussion below). Though for convenience, the frequency and amplitude of each drive signal produced by each of these drive circuit is the same; they need not be and can be set to any value within the fundamental frequency range noted above. If different drive frequencies and amplitudes are used, then each PZT in this group will independently resonate at a fixed frequency and fixed amplitude different from those of the other two PZTs in that group.

As a result of being excited by a drive signal at a given frequency, each of the PZTs in group 2, just like those in group 1, will also exhibit time-varying geometric and physical displacement, thereby imparting a time-varying birefringence into the fiber wound around that PZT which, in turn, causes a change in the SOP produced by that PZT.

Table 2 below provides exemplary values for the drive signal produced by each of drive circuits $20_d$, $20_e$ and $20_f$, where sinusoidal excitation at a fixed frequency ($f_0$) and at constant amplitude (V) is used to independently excite each of the corresponding PZTs:

TABLE 2

EXEMPLARY FIXED FREQUENCY DRIVE SIGNAL PARAMETERS

| $f_0$ | 550 kHz |
|---|---|
| V | 0 ≦ V ≦ 20 volts |

As previously noted with conventional optical scramblers that utilize a single PZT, a fixed-frequency fixed-amplitude PZT requires accurate control over its input SOP to provide optimum scrambling. However, partial scrambling occurs at all but a few precise input SOPs. Therefore, through scrambler 5 where a pseudo-random input SOP is provided through the action of the three PZTs in group 1 driven with an FM/AM drive signal, ineffective scrambling occurs for advantageously only very brief periods and is a function of the number of modulated RF stages and the fundamental RF frequency, $f_0$, used in that group. Though I have described the sequence of the groups as having the FM/AM stages first followed by the non-modulated stages, the order can be reversed which results in a small change in the optical characteristics (e.g., o-e conversion of the Stokes linear electrical RF spectral distribution).

Through empirical measurements of an isolated fiber-wrapped excited PZT, I have found that two nearly orthogonal SOPs can exist: one with a minimum DOP (degree of polarization) and another with a maximum DOP. The number and magnitude of these nearly orthogonal SOPs depend on how the fiber is wrapped around the PZT. Because of a nearly orthogonal orientation of these SOPs, both are assumed to arise from the voltage-induced time-varying birefringence. Apparently, symmetry of the stresses induced in the fiber in one direction are minimized in the other orthogonal orientation, hence resulting in a stress-free orientation that permits a small group of SOPs to propagate unaffected through the PZT. I have found that a number and extent (periods of time during which ineffective scrambling occurs) of these unaffected SOPs can be advantageously reduced through proper fiber winding around the PZT, proper choice of RF modulation format, and by cascading a number of PZTs. Specifically, the higher the fundamental frequency and the greater the number of stages (individual PZTs in a group), then the briefer will the ineffective scrambling periods be. Provided that the input SOP is pseudo-random, as will be the case through use of the PZTs in group 1 as described above, three single-frequency PZT stages (10$_d$, 10$_e$ and 10$_f$) have been found, in practice, to provide effective scrambling.

Two general methods can be used to properly wind (wrap) single-mode optical fiber onto a cylindrical PZT to enable polarization-independent operation. In both instances, the fiber is referred to by those skilled in the art as "bare-fiber", i.e., it has an outside diameter of 250 μm or 80 μm. Regardless of the outside diameter of the fiber, the fiber has an acrylic (or similar) protective outer coating that resists moisture and mechanical abrasion to varying degrees. The particular type of fiber being used is not critical, and, as such, nearly any variety can be used, such as dispersion-shifted, matched-clad or depressed-clad. The particular variety is chosen based on desired specifications such as the operating wavelength and insertion-loss resulting from macro-bend loss.

Both winding methods involve spinning a PZT (onto which the fiber is wound) along its length and a source spool that is also allowed to spin.

The first method involves physically constraining the fiber at a distance that is close to the spinning tube (within, e.g., a fraction of an inch (or centimeter)) during the winding process—which results in keeping a fixed radial surface of the fiber against the surface of the PZT along an entire portion of a predetermined length of the fiber. The required length of fiber (i.e., amount of fiber that is wound around the PZT) is determined by the drive capability of a power amplifier (as discussed below) that drives the PZT and the responsiveness of the ceramic material that forms the PZT to drive voltage produced by that amplifier. The fiber is then rotated a few degrees so that a different radial surface of the fiber faces the same or different PZT. This is repeated until every orientation of the radial surface of the fiber is in contact with the PZT.

The second method involves physically constraining the fiber at a distance of more than the circumference of the PZT during the winding process. At this constrained distance, a naturally occurring event takes place where the fiber rotates 360° for each 360° through which the PZT revolves. This results in each surface of the fiber coming into physical contact with the PZT.

With the above in mind, I will now discuss the two different drive circuits in detail.

FIG. 2 depicts a block diagram of FM/AM drive circuit 200 and its associated PZTs 10$_a$, 10$_b$ and 10$_c$, where this drive circuit forms each of FM/AM PZT drive circuits 20$_a$, 20$_b$ and 20$_c$.

As shown, the FM/AM drive circuit is formed of function generator 210, frequency modulator 220, amplitude modulator 230 and power amplifier 240. Function generator 210 generates an RF signal at fundamental frequency f$_0$. This signal is then applied, via lead 215, to an input of frequency modulator 220. A resulting frequency modulated (FM) signal is then applied, via lead 225, to an input of amplitude modulator 230 which, in turn, imparts an amplitude modulation to each carrier frequency produced by the frequency modulator. A resulting FM/AM signal is then applied, via lead 235, to an input of buffered power amplifier 240 which amplifies that signal to a sufficient level necessary to drive the associated PZT (10$_a$, 10$_b$ or 10$_c$).

The optical signal is shown as a dashed line and is propagated by fiber 4 that is wrapped around the associated PZT.

FIG. 3 depicts a block diagram of drive circuit 300 and its associated PZTs 10$_d$, 10$_e$ and 10$_f$, with this drive circuit forming each of PZT drive circuits 20$_d$, 20$_e$ and 20$_f$.

This drive circuit, generating a signal at fixed frequency and fixed amplitude, merely contains function (frequency) generator 310 and power amplifier 320. Function generator 310 generates an RE signal at fundamental frequency f$_0$. This signal is then directly applied, via lead 315, to an input of buffered power amplifier 320, which, in turn, amplifies that signal to a sufficient level, but here unmodulated RE, necessary to drive the associated PZT (10$_d$, 10$_e$ or 10$_f$)

In each of circuits 200 and 300, and as discussed above, the SOP of the optical signal traveling through each PZT in each such circuit is altered by the voltage-induced, time-varying birefringence caused by the physical interaction of that PZT with that portion of fiber 4 which is wrapped around that tube.

Figure 4:
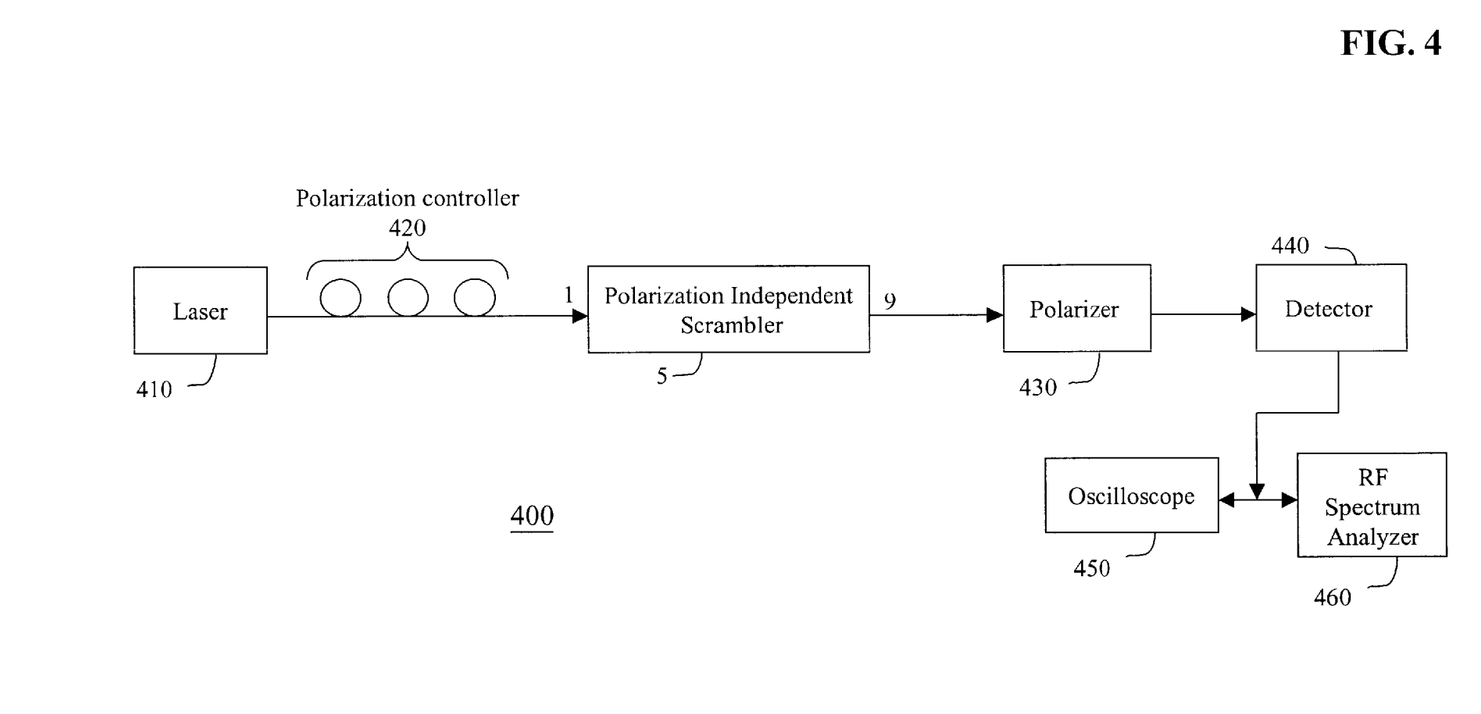
FIG. 4 depicts test and measurement setup 400 for use in conjunction with my inventive optical scrambler.

FIG. 4 depicts test and measurement setup 400 for use in conjunction with my inventive optical scrambler. This setup is formed of laser 410 generating continuous-wave (CW) light that is successively channeled through polarization controller 420, inventive polarization independent scrambler 5 and polarizer 430. The light then transiting through polarizer 430 is applied to optical detector 440 with a resulting detected output, as an electrical signal, being applied both to oscilloscope 450 and RF spectrum analyzer 460.

When the scrambled signal appearing at output 9 of inventive scrambler 5 is passed into a highly polarized component, such as a polarizer 430, and then into fast optical detector 440 (i.e., bandwidth in excess of 100 MHz), effects of the scrambled signal can be seen on oscilloscope 450 or RF spectrum analyzer 460.

With the scrambler inactive, polarization controller 420 is adjusted to set the SOP of continuous-wave signal provided by laser 410 for a maximum and minimum transmission through the polarizer. On oscilloscope 450, this phenomena is viewed as a horizontal line moving between near zero volts and some arbitrary maximum voltage V$_{max}$. This shows the effect that highly polarized light, with a relatively constant SOP, has in the presence of a polarizer and provides experimental measurement of V$_{max}$.

When polarization independent scrambler 5 is activated, oscilloscope 450 reveals the amplitude of the detected voltage rapidly varying between near zero and the previously determined V$_{max}$. Furthermore, adjustments of the polarization controller, similar to those conducted earlier, show a change in a time-integrated average dc value (V$_{max}$/2) of less than 0.03 dB. The extent of this change is determined by the number of stages and reveals excellent polarization independence.

When this varying amplitude, resulting from the scrambled signal and the polarizer, is measured on the RF spectrum analyzer, the spectral components reveal an almost constant amplitude spectrum from below approximately 1 kHz to approximately 4 MHz (at the 10 dB high roll-off with values similar to those mentioned earlier). This corresponds directly to the changes in SOP pseudo-randomly occurring across an equator of the Poincaré sphere.

In sharp contrast, spectral analysis of a conventional scrambling technique, involving use of a single fiber-wrapped PZT driven at a fixed-frequency and fixed-amplitude, reveals highly defined resonance peaks corresponding to its fundamental drive frequency and its harmonics (i.e., $f_0$, $2 \cdot f_0$, $3 \cdot f_0$, $4 \cdot f_0$, and so forth). This means that, for that technique, the SOP is moving about the Poincaré sphere at certain well-defined rates. On the other hand, the almost "white-noise" quality of the spectrum produced through my inventive scrambler, which results directly from combined use of FM/AM modulated, and fixed-frequency/fixed amplitude electrical drive is significantly different—and clearly superior to the conventional technique due to enhanced pseudo-randomness in which the resulting SOP moves about the Poincaré sphere.

An ideal polarization scrambler scrambles the polarization without affecting the amount of power of the signal. The constant change is referred to as insertion-loss, which, in the inventive scrambler, was measured to be less than approximately 0.8 dB. Also, by removing polarizer 430, set-up 400 can be used to measure the time-varying change in the CW signal. Using this methodology, residual AM was measured to less than 2%.

As noted above, the number of cascaded PZTs in each group is not critical, with increasing randomness being achieved through use of additional PZTs. I have found that use of three individual cascaded PZTs in each group is sufficient, with the marginal improvement diminishing for each additional PZT used thereafter. Furthermore, the specific form of modulation (e.g., FM/AM) as well as the parameters used therein, e.g., fundamental frequency, offset frequency range, rate of FM deviation, amplitude modulation depth and rate are all not critical, provided values of these parameters are all chosen that collectively provide sufficient variation in the physical action of the resonating PZTS, when imparted to the fiber wrapped there around, to impart adequately random scrambling of the optical SOP. In addition, other forms of modulation, such as pulse, and/or combinations of multiple forms can be used in lieu of FM/AM, or generally speaking, of any of the time-varying signals itself, as long as it produces a PZT drive voltage with a sufficiently wide and time-varying dynamic range. Moreover, the specific time-variation that is used is not critical either and a wide variety of alternate time-dependent functions, other than sinusoidal or a linear ramp, can be used.

Furthermore, while the inventive scrambler has been described as preferably having a single fiber threaded through the scrambler and wound around each of the PZTs in succession and optically inter-connecting these PZTs, a separate fiber could be wound each of the PZTs and appropriately connected together through suitably low-loss optical connectors.

In addition, while I have described the birefringence between each pair of PZTs as being fixed and implemented through, e.g., a length of optic fiber, variable birefringences implemented through other optical devices, with appropriate optical connectors to interconnect to the optical fiber(s) wrapped around the PZTs, could be used instead, though circuit and optical complexity and concomitant cost will undoubtedly increase as a result.

Although a single embodiment which incorporates the teachings of the present invention has been shown and described in appropriate detail herein, those skilled in the art can readily devise many other embodiments that still utilize these teachings.

I claim:

1. Apparatus for an optical scrambler (5) which scrambles a state of polarization (SOP) of light entering the scrambler, at an optical input (1), to yield a scrambled SOP of said light as it exits the scrambler at an optical output (9), the apparatus comprising:

a plurality of optically cascaded piezoelectric tubes (PZTs) (10), wherein each of said tubes is optically interconnected to a next successive one of the tubes through a corresponding device that provides optical birefringence so as to define at least one corresponding device (30$_a$), such that the light serially propagates from the optical input through the associated fiber wrapped around each of said PZTs and the at least one corresponding device to said optical output, wherein each of the PZTs is driven by a corresponding electrical drive signal and has an associated optical fiber wound around said each PZT such that said each PZT exhibits time-varying physical displacement in response to the corresponding drive signal thereby inducing variable birefringence in the optical fiber wrapped around said each PZT;

a first drive circuit (20$_a$) connected to a first one of the PZTs, wherein the first drive circuit generates, as a first drive signal to the first PZT, a first time-varying signal, wherein the first drive signal comprises a modulated signal having both frequency and amplitude variations; and a second drive circuit (20$_d$) connected to a second one of the PZTs, different from the first PZT, wherein the second drive circuit generates, as a second drive signal to the second PZT, a second time-varying signal which is independent of the first signal, wherein the second drive signal comprises a substantially fixed frequency and a substantially fixed amplitude.

2. The apparatus in claim 1 further comprising:

a plurality of first drive circuits (20$_a$, 20$_b$, 20$_c$) each of which generates a corresponding first drive signal, so as to define a plurality of first drive signals, for a different one of a first group of optically cascaded ones of said PZTs (10$_a$, 10$_b$, 10$_s$); and a plurality of second drive circuits (20$_d$, 20$_e$, 20$_f$) each of which generates a corresponding second drive signal, so as to define a plurality of second drive signals, for a different one of a second group of optically cascaded ones of said PZTs (10$_d$, 10$_e$, 10$_f$), said first and second groups of PZTs being distinct from, though in optical communication with, each other.

3. The apparatus in claim 2 wherein each of the first drive signals comprises a modulated frequency, varying within a predefined frequency range, and having a different amplitude, within a predefined amplitude range, such that each modulated frequency has a different amplitude.

4. The apparatus in claim 3 wherein the frequency and amplitude of each of the first drive signals changes at predefined rates within the predefined frequency and amplitude ranges, respectively.

5. The apparatus in claim 4 wherein one of the first drive signals exhibits either substantially the same or different frequency or amplitude variations as at least another one of the first drive signals.

6. The apparatus in claim 5 wherein each of the first drive circuits comprises:

a function generator (210) for generating a fundamental frequency signal; and either:

a modulation circuit having:
  a frequency modulator (220) for frequency modulating the fundamental frequency signal so as to generate a frequency modulated (FM) signal; and
  an amplitude modulator (230) for amplitude modulating the frequency modulated signal so as to generate a resulting signal; or
a modulation circuit having:
  an amplitude modulator for amplitude modulating the fundamental frequency so as to generate an amplitude modulated signal; and
  a frequency modulator for frequency modulating the amplitude modulated signal so as to generate the resulting signal; and
a power amplifier (240) for amplifying the final signal so as to yield the corresponding different one of the first drive signals.

7. The apparatus in claim 6 wherein the fundamental frequency lies within a range of approximately 100 kHz to approximately 1 MHz and changes, within a predefined frequency deviation, at a rate of between 1 Hz/second to approximately 1 MHz/second.

8. The apparatus in claim 7 wherein the total frequency deviation has a value within a range of approximately 1 Hz to approximately 1 MHz.

9. The apparatus in claim 5 wherein one of the second drive signals exhibits frequency and amplitude values substantially identical to those of another one of the second drive signals.

10. The apparatus in claim 9 wherein each of the second drive signals has a frequency within a range of approximately 100 kHz to approximately 1 MHz.

11. The apparatus in claim 10 wherein each of the first drive circuits comprises:
  a function generator (310) for generating a fundamental frequency signal; and
  a power amplifier (320) for amplifying the fundamental signal so as to yield the corresponding different one of the second drive signals.

12. The apparatus in claim 5 further comprising multiple corresponding devices ($30_a$, $30_b$, $30_c$, $30_d$, $30_e$) optically connected to corresponding ones of the PZTs, wherein each of the corresponding devices produces a fixed amount of optical birefringence.

13. The apparatus in claim 12 wherein all the corresponding devices produce substantially identical amounts of fixed optical birefringence.

14. The apparatus in claim 12 wherein each of the corresponding devices is formed of a length of optical fiber.

15. The apparatus in claim 14 wherein a common fiber (4) forms each of the corresponding devices and is wrapped around each of the PZTs.

16. The apparatus in claim 14 wherein the length of optical fiber that forms each of the corresponding devices has a predetermined number of twists oriented in a predefined direction.

17. A method for use in an optical scrambler (5) which scrambles a state of polarization (SOP) of light entering the scrambler, at an optical input (1), to yield a scrambled SOP of said light as it exits the scrambler at an optical output (9), the scrambler having:
  a plurality of optically cascaded piezoelectric tubes (PZTs) (10), wherein each of said tubes is optically interconnected to a next successive one of the tubes through a corresponding device ($30_a$) that provides optical birefringence so as to define at least one corresponding device, such that the light serially propagates from the optical input through the associated fiber wrapped around each of said PZTs and the at least one corresponding device to said optical output, wherein each of the PZTs is driven by a corresponding electrical drive signal and has an associated optical fiber wound around said each PZT such that said each PZT exhibits time-varying physical displacement in response to the corresponding drive signal thereby inducing variable birefringence in the optical fiber wrapped around said each PZT; and
  first and second drive circuits (20) connected to first and second different corresponding ones of the PZTs for supplying first and second drive signals to the first and second PZTs, respectively;
wherein the method comprises the steps of:
  generating through the first drive circuit ($20_a$) a first-time varying signal, as the first drive signal, wherein the first drive signal comprises a modulated signal having both frequency and amplitude variations; and
  generating in the second drive circuit ($20_d$), as the second drive signal, a second time-varying signal which is independent of the first drive signal, wherein the second drive signal comprises a substantially fixed frequency and a substantially fixed amplitude.

18. The method in claim 17 further comprising the steps of:
  generating, through each of a plurality of first drive circuits ($20_a$, $20_b$, $20_f$), a corresponding first drive signal, so as to define a plurality of first drive signals, for a different one of a first group of optically cascaded ones of said PZTs ($10_a$, $10_b$, $10_c$) ; and
  generating, through a plurality of second drive circuits ($20_d$, $20_e$, $20_f$), a corresponding second drive signal, so as to define a plurality of second drive signals, for a different one of a second group of optically cascaded ones of said PZTs ($10_a$, $10_e$, $10_f$), said first and second groups of PZTs being distinct from, though in optical communication with, each other.

19. The method in claim 18 wherein each of the first drive signals comprises a modulated frequency, varying within a predefined frequency range, and having a different amplitude, within a predefined amplitude range, such that each modulated frequency has a different amplitude.

20. The method in claim 19 further comprising the step of changing the frequency and amplitude of each of the first drive signals at predefined rates within the predefined frequency and amplitude ranges, respectively.

21. The method in claim 20 wherein one of the first drive signals exhibits either substantially the same or different frequency or amplitude variations as at least another one of the first drive signals.

22.The method in claim 21 further comprising the steps, in each of the first drive circuits, of:
  generating a fundamental frequency signal; and
  either:
    modulating the fundamental frequency by:
      frequency modulating the fundamental frequency so as to generate a frequency modulated (FM) signal; and
      amplitude modulating the frequency modulated signal so as to generate a resulting signal; or
    modulating the fundamental frequency by:
      amplitude modulating the fundamental frequency so as to generate an amplitude modulated signal; and frequency modulating the amplitude modulated signal to generate a resulting signal; and amplifying the resulting signal so as to yield the corresponding different one of the first drive signals.

23. The method in claim 22 wherein the fundamental frequency lies within a range of approximately 100 kHz to approximately 1 MHz and changes, within a predefined frequency deviation, at a rate of between 1 Hz/second to approximately 1 MHz/second.

24. The method in claim 23 wherein the total frequency deviation has a value within a range of approximately 1 Hz to approximately 1 MHz.

25. The method in claim 21 wherein one of the second drive signals exhibits frequency and amplitude values substantially identical to those of another one of the second drive signals.

26. The method in claim 25 wherein each of the second drive signals has a frequency within a range of approximately 100 kHz to approximately 1 MHz.

27. The method in claim 26 further comprising the steps, in each of the first drive circuits, of:

generating a fundamental frequency signal; and amplifying the fundamental signal so as to yield the corresponding different one of the second drive signals.

28. The method in claim 21 further comprising the step of producing, through each one of a plurality of corresponding devices optically connected to corresponding ones of the PZTs, a fixed amount of optical birefringence.

29. The method in claim 28 further comprising the step of producing, through all of the corresponding devices, substantially identical amounts of fixed optical birefringence.

30. The method in claim 28 comprising the step of forming each of the corresponding devices from a length of optical fiber.

31. The method in claim 30 comprising the step of using a common fiber (4) to form each of the corresponding devices and to wrap around each of the PZTs.

32. The method in claim 30 further comprising the step of imparting a predetermined number of twists oriented in a predefined direction to the length of optical fiber that forms each of the corresponding devices.

* * * * *